United States Patent [19]

Nishio

[11] Patent Number: 5,154,453
[45] Date of Patent: Oct. 13, 1992

[54] PIPE JOINT MADE OF RESIN

[75] Inventor: Kiyoshi Nishio, Takarazuka, Japan

[73] Assignee: Nippon Pillar Packing Co., Ltd., Osaka, Japan

[21] Appl. No.: 693,094

[22] Filed: Apr. 30, 1991

Related U.S. Application Data

[63] Continuation of Ser. No. 407,658, Sep. 15, 1989, abandoned.

[30] Foreign Application Priority Data

Oct. 26, 1988 [JP] Japan ............................ 63-139535[U]
Jun. 14, 1989 [JP] Japan ................................ 1-69378[U]

[51] Int. Cl.$^5$ .............................................. F16L 19/06
[52] U.S. Cl. .................................... 285/342; 285/341; 285/351; 285/353; 285/423
[58] Field of Search ...................... 285/342, 343, 334.5, 285/246, 249, 423, 341, 351

[56] References Cited

U.S. PATENT DOCUMENTS

| 2,463,883 | 3/1949 | Kinsey | 285/334.5 X |
| 3,381,982 | 5/1968 | Elek | 285/423 X |

FOREIGN PATENT DOCUMENTS

| 477129 | 10/1975 | Australia | 285/249 |
| 844778 | 8/1934 | France | 285/244 |
| 1237522 | 6/1960 | France | 285/249 |
| 1238867 | 7/1960 | France | 285/334.5 |
| 2373012 | 8/1978 | France | 285/249 |
| 54747 | 6/1943 | Netherlands | 285/342 |
| 1227282 | 4/1971 | United Kingdom | 285/246 |

Primary Examiner—Dave W. Arola
Attorney, Agent, or Firm—Jones, Tullar & Cooper

[57] ABSTRACT

In a pipe joint made of resin in accordance with the present invention, a primary sealing is formed between an inner ring pressingly inserted into an insertion portion of a pipe at its one end to increase the diameter thereof, and the joint body into which the insertion portion of the pipe increased in diameter, is being inserted. When the threaded connection of a pushing ring to the joint body is advanced, a sealing force is applied to the primary sealing. The inner ring has an inner diameter equal to that of the joint body and that of the pipe, assuring a smooth movement of a fluid in the pipe without the fluid remaining at the joint.

21 Claims, 2 Drawing Sheets

PIPE JOINT MADE OF RESIN

This is a continuation of co-pending application Ser. No. 07/407,658 filed on Sep. 15, 1989, now abandoned.

BACKGROUND OF THE INVENTION

1. Field of the Invention

The present invention relates to a pipe joint made of resin to be suitably used for a pipe used for a fluid which is a liquid having high purity or ultrapure water, or which is a fluid adapted to undergo a change in temperature. More specifically, the present invention provides a pipe joint made of resin capable of assuring both excellent sealing properties regardless of fluid temperature variations and good flowability enabling the fluid to smoothly flow in the pipe without remaining at the pipe joint.

2. Description of the Prior Art

There is known a pipe joint made of resin of the type above-mentioned, for example, as shown in FIG. 6. In FIG. 6, a cylindrical joint body A has a pipe receiving portion into which an insertion portion b1 at one end of a pipe B is to be inserted. The pipe receiving portion is provided at the inlet thereof with a sealing tapering portion a1, the diameter of which is gradually reduced in a direction toward the inside of the joint body A. An outer ring D is provided at the inner end thereof with a sealing portion d1 coming in contact with the sealing portion a1. The outer ring D is put immediately outside of the insertion portion b1 of the pipe B. This causes the pipe B to be locally pushed diametrically inwardly at b2.

An external thread portion a2 at one end of the joint body A is threadedly connected to an internal thread portion e1 of a pushing ring E. By forwarding such threaded connection, the outer ring D is pushed toward the joint body A. This imparts a sealing force to the sealing portions a1 and d1.

Accordingly, the pipe B is regulated by the outer ring D so restricted as to be axially immovable by the joint body A and the pushing ring E. This prevents the pipe B from coming out from the joint body A. The inner surface of the outer ring D is pressingly contacted with the projecting portion b2 to generate a sealing force. This sealing force together with the sealing force at the sealing portions a1 and d1, prevents leakage of fluid to the outside in the pipe B and an entry of foreign matter into the pipe B.

However, the conventional pipe joint made of resin shown in FIG. 6 involves the likelihood that, with the passage of time, the projecting portion b2 of the pipe B experiences stress relaxation which lowers the sealing force between the inner surface of the outer ring D and the outer surface of, the projecting portion b2, resulting in deterioration of the sealing properties. This may provoke a micro-leakage of the fluid. Further, if the fluid has a high temperature, the pipe B is softened to accelerate the stress relaxation of the projecting portion b2. This results, in a short period of time, in a decrease in the sealing force between the inner surface of the outer ring D and the outer surface of the projecting portion b2, causing the fluid to leak.

There is also known a pipe joint as shown in FIG. 7. In FIG. 7, the joint body A has a pipe receiving portion into which an insertion portion b1 at one end of a pipe B is to be inserted. The pipe receiving portion is provided at the inlet thereof with a sealing tapering portion a1, the diameter of which diameter is gradually reduced in a direction toward the inside of the joint body A. An inner ring F has a peripheral wall f having a trapezoidal section, is pressingly inserted in the pipe B immediately inside of the insertion portion b1 thereof. This causes the pipe B to locally project diametrically outwardly at b3. An external thread portion a2 at one end of the joint body A is threadably connected to an internal thread portion e1 of a pushing ring E. By forwarding such threaded connection, the projecting portion b3 of the pipe B and the inner ring F are pushed toward the joint body A, so that the inclined surface of the projecting portion b3 is pushed to the sealing portion a1 to generate a sealing force.

Accordingly, the projecting portion b3 of the pipe B is held by and between the sealing portion a1 of the joint body A and a pressing portion e2 of the pushing ring E and the peripheral wall f of the inner ring F. This prevents the pipe B from coming out from the joint body A. Further, the inclined surface of the projecting portion b3 is pushed to the sealing portion a1 to generate a sealing force. This sealing force prevents a leakage to the outside of the fluid in the pipe B and an entry of foreign matter into the pipe B.

In the conventional pipe joint made of resin shown in FIG. 7, the spontaneous stress relaxation at an ambient temperature is less than that in the pipe joint shown in FIG. 6. Accordingly, the pipe joint in FIG. 7 provides sealing properties slightly higher than those provided by the pipe joint in FIG. 6. However, if the fluid has a high temperature, the inner ring F directly exposed to the fluid is apt to be easily softened. Accordingly, the stress relaxation of the inner ring F to decrease the pushing force exerted to, the projecting portion b3 of the pipe B becomes considerable. Thus, the sealing force is lost to cause the fluid to leak.

In addition to the problems above-mentioned, the pipe joints made of resin shown in FIGS. 6 and 7 present the following problems.

In each of the pipe joints in FIGS. 6 and 7, the flow path of the pipe B is not uniform in section. That is, the pipe B is locally reduced in diameter due to the projecting portion b1 or the inner ring F. This prevents the fluid from being smoothly moved. Particularly in the pipe joint in FIG. 7, there is formed a fine gap between the outer surface of the peripheral wall f of the inner ring F and the inner surface of the projecting portion b3. This causes the fluid to remain in this gap. Accordingly, the pipe joint in FIG. 7 is not suitable as a joint for a pipe used for a liquid having a high purity or ultrapure water of which smooth movement is required. This imposes restrictions on the use of such a pipe joint.

SUMMARY OF THE INVENTION

In view of the foregoing, the present invention is proposed with a main object of: providing a pipe joint made of resin, in which an insertion portion at one end of a pipe into which an inner ring is being pressingly inserted to increase the inner diameter of the insertion portion, is inserted into a pipe receiving portion at one end of a cylindrical joint body; providing a strong force for preventing the pipe from separating from the joint, while restraining stress relaxation regardless of fluid temperature variations; and assuring excellent sealing properties at a primary sealing and flowability enabling the joint to be applied for a pipe used for a liquid having a high purity or ultrapure water.

It is another object of the present invention to provide a pipe joint made of resin which provides, in addition to the primary sealing as above-mentioned, a secondary sealing assuring excellent sealing properties and enabling the stress relaxation to be restrained.

To achieve the main object above-mentioned, the pipe joint made of resin in accordance with an embodiment of the present invention comprises:

a primary sealing portion formed at the inner part of a pipe receiving portion of the joint body and extending in a direction crossing the axis of the joint;

an inner-end sealing portion formed in the inner ring and coming in contact with the primary sealing portion; and a pushing ring threadedly connected to one end of the joint body, and adapted to cause the primary sealing portion to come in contact with the inner-end sealing portion to form a primary sealing when the threaded connection of the pushing ring to the joint body is forwarded;

the inner ring having an inner diameter equal to or substantially equal to that of the pipe and that of the joint body.

According to the pipe joint made of resin having the arrangement above-mentioned, a strong sealing force is formed between the primary sealing portion of the joint body and the inner-end sealing portion of the inner ring when the threaded connecti,on of the end ring to the joint body is forwarded or advanced. The primary sealing thus formed receives an axial pressing force. Accordingly, stress relaxation is considerably restrained not only at an ambient temperature but also at temperature variations (increase). Thus, the pipe joint of the present ivnention assures excellent sealing properties regardless of fluid temperature variations, thereby improving sealing reliability.

Further, the pipe is held by and between the joint body and the axially immovable inner ring. This enables the pipe to be, maintained with a strong force to prevent separation.

The inner ring which does not prevent the fluid from being moved, is pressingly inserted into the insertion portion of the pipe. Accordingly, the flow path is uniform in section, assuring a smooth movement of the fluid in the pipe without remaining at the pipe joint. Thus, the pipe joint of the present invention may be suitably used as a joint for a pipe used for a liquid having high purity or ultrapure water.

The pipe joint made of resin in accordance with another embodiment of the present invention comprises, in the pipe joint in accordance with the embodiment mentioned earlier:

a projecting portion formed on the outer periphery of the outer end of the inner ring; and a secondary sealing portion formed at the inlet of the pipe receiving portion of the joint body, and extending in a direction crossing the axis of the joint;

the secondary sealing portion being adapted to come in contact with the outer peripheral sealing surface of the insertion portion of a pipe formed at the time when the insertion portion is pressed to the projecting portion, the outer peripheral sealing surface being diametrically inwardly inclined in a direction toward the end of the pipe;

the pushing ring being adapted to cause the secondary sealing portion to come in contact with the outer peripheral sealing surface of the pipe to form a secondary sealing when the threaded connection of the pushing ring to the joint body is forwarded or advanced.

The pipe joint having the arrangement above-mentioned, additionally presents the following operational effects.

A strong sealing force is generated also between the secondary sealing portion of the joint body and the outer peripheral sealing surface of the pipe. The secondary sealing also receives an axial pressing load. Accordingly, stress relaxation is considerably restrained likewise in the pipe joint in accordance with the embodiment mentioned earlier. Thus, two-stage sealings including primary and secondary sealings, securely prevent a leakage of fluid to the outside, as well as entry of foreign matter into the pipe.

The pipe joint made of resin in accordance with a further embodiment of the present invention comprises, in the pipe joint in accordance with the first-mentioned embodiment;

an outer ring put on the insertion portion of a pipe;

a secondary sealing portion formed at the inlet of the pipe receiving portion of the joint body, and extending in a direction crossing the axis of the pipe joint; and an inner-end sealing portion formed at the outer ring and coming in contact with the secondary sealing portion;

the pushing ring being adapted to cause the secondary sealing portion to come in contact with the inner-end sealing portion to form a secondary sealing when the threaded connection of the pushing ring to the joint body is forwarded or advanced.

The pipe joint having the arrangement above-mentioned, additionally presents the following operational effects.

The insertion portion of the pipe at one end thereof is held by and between the axially immovable inner and outer rings. Accordingly, the pipe may be maintained with a strong force for preventing the pipe from separating out from the joint. Further, a strong sealing force is also generated between the secondary sealing portion of the joint body and the inner-end sealing portion of the outer ring in a state where stress relaxation may be considerably restrained.

Other features and effects of the present invention will be apparent from the following description.

DETAILED DESCRIPTION OF THE PREFERRED EMBODIMENTS

Figure 1:
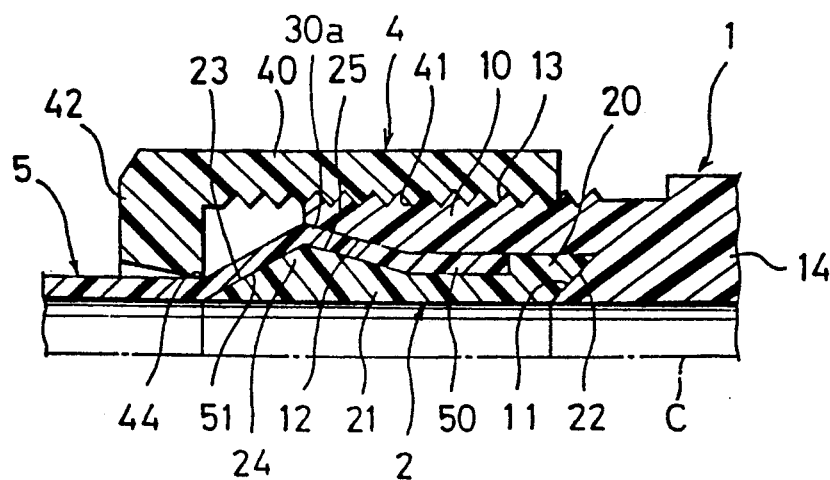
FIG. 1 is a section view of a half portion of a pipe joint made of resin in accordance with the present invention.

The pipe joint made of resin in accordance with the present invention has a joint body 1 made of resin having characteristics excellent in chemical resistance and heat resistance such as PFA, PTFE, ETFE, CTFE, ECTFE or the like, an inner ring 2 and a pushing ring 4.

The joint body 1 is cylindrical and has a pipe receiving portion 10 at one end thereof. A first primary sealing portion 11 is formed at the inner part of the pipe receiving portion 10 and extends in a direction crossing the axis C of the pipe joint. A secondary sealing portion 12 is formed at the inlet of the pipe receiving portion 10 and extends in a direction crossing the axis C. The pipe receiving portion 10 is provided on the outer periphery thereof with an external thread portion 13. The pipe receiving portion 10 has an inner diameter greater than the inner diameter of a trunk 14 of the pipe joint. The first primary sealing portion 11 is formed by a tapering surface which is gradually inclined from the inner part of the pipe receiving portion 10 toward the axis C. The secondary sealing portion 12 is formed by a tapering surface which is gradually inclined from the intermediate part of the pipe receiving portion 10 in a direction away from the axis C. That is, the secondary sealing portion 12 is formed at the inlet part of the pipe receiving portion 10.

The inner ring 2 is provided at the inner end thereof with a fitting portion 20 having such an outer diameter as to be fitted in the pipe receiving portion 10 of the pipe joint 1. The inner ring 2 has a pressing insertion portion 21 which is continuous with the fitting portion 20. The pressing insertion portion 21 has a diameter smaller, by an amount corresponding to the thickness of a pipe 5, than that of the fitting portion 20. The inner ring 2 is generally made in the form of a sleeve. The inner diameter of the inner ring 2 is the same as that of the pipe 5 and that of the trunk 14 of the joint body 1. This assures a smooth movement (flowing) of a fluid in the pipe 5. The inner ring 2 is provided at the inner end thereof with an inner-end sealing portion 22 having a tapering surface adapted to come in contact with the first primary sealing portion 11.

The inner ring 2 is provided on the outer surface of the outer end thereof, i.e., on the outer surface of the outer end of the pressing insertion portion 21, with a tapering outer-end sealing portion 23 the diameter of which is gradually increased in a direction from the outer end thereof to the inner end thereof, and of which outer end crosses the inner surface of the inner ring 2. The top portion of the outer-end sealing portion 23 has a diameter greater than that of at least the pressing insertion portion 21 as a connecting portion with respect to the fitting portion 20. In FIG. 1, the outer diameter of the sealing portion 23 is greater than that of the fitting portion 20 of the inner ring 2. That is, the greater-diameter portion of the outer-end sealing portion 23 is formed as a projecting portion 24 having a section in the form of a mountain, which is formed on the outer peripheral surface at the outer end of the inner ring 2. The inner ring 2 has a tapering surface 25 which is gradually inclined from the top of the projecting portion 24 toward the axis C. The tapering surface 25 is inclined at the same angle at which the secondary sealing portion 12 of the joint body 1 is inclined. The tapering surface 25 is formed such that the distance between the secondary sealing portion 12 and the tapering surface 25 corresponds to the thickness of the pipe 5, when the inner-end sealing portion 22 comes in contact with the first primary sealing portion 11.

The inner ring 2 having the arrangement above-mentioned is coupled integrally to the pipe 5 with the pressing portion 21 being inserted into one end of the pipe 5, causing the peripheral wall thereof to diametrically project. At this time, the projecting peripheral wall of the pipe 5 serves as an insertion portion 50 to be inserted into the pipe receiving portion 10 of the joint body 1. When the insertion portion 50 is inserted into the pipe receiving portion 10, the inner-end sealing portion 22 comes in contact with the first primary sealing portion 11 of the joint body 1 and the outer-end sealing portion 23 comes in contact with the inner surface of an inclined portion 51 of the insertion portion 50. Further, a portion of the insertion portion 50 of the pipe 5 is inclinedly held by and between the secondary sealing portion 12 of the joint body 1 and the tapering surface 25 of the inner ring 2. That is, the outer peripheral surface of the pipe 5 parallel with the tapering surface 25, serves as an outer peripheral sealing surface 30a.

A pushing ring 4 has a cylindrical body 40. The cylindrical body 40 is provided on the inner peripheral surface thereof with an internal thread portion 41 to be threadedly connected to the external thread portion 13 of the joint body 1. The cylindrical body 40 is also provided at the outer end thereof with an annular pushing piece 42 projecting toward the axis C. The pushing piece 42 is provided at the diametrically inward and inner end thereof with a pushing edge portion 44. The pushing edge portion 44 is formed at a position near to the axis C with respect to not only the top of the projecting portion 24 of the pressing insertion portion 21 but also the outer peripheral surface of the adjacent portion to the fitting portion 20.

The pushing ring 4 having the arrangement above-mentioned is adapted to push the inner ring 2 toward the joint body 1 through the pipe 5 (more specifically, the joint body 1 and the inner ring 2 are pushed toward each other), and to push the pipe 5 toward the joint body 1 (more specifically, the joint body 1 and the pipe 5 are pushed toward each other). Thus, the pushing ring 4 provides a sealing force so as to maintain the joint body 1, the inner ring 2 and the pipe 5 integrally coupled to one another.

According to the arrangement above-mentioned, when the pressing insertion portion 21 of the inner ring 2 is first inserted into the end of the pipe 5, the end of the pipe 5 is generally increased in diameter. That portion of the pipe 5 corresponding to the projecting portion 24 of the inner ring 2 is formed as the insertion portion 50 the inner diameter of which is further increased. The inner ring 2, the insertion portion 21 of which is being inserted into the end of the pipe 5, and the insertion portion 50 at one end of the pipe 5, are inserted into the pipe receiving portion 10 of the joing body 1. This causes the inner-end sealing portion 22 to come in contact with the first primary sealing portion 11. Then, the pushing ring 4 previously put on the pipe 5 is threadedly connected, at the internal thread portion 41 thereof, to the external thread portion 13 of the joint body 1. By forwarding or advancing such threaded connection, the joint body 1 is strongly fastened, causing the pipe 5 to be connected to the joint body 1.

By connecting the pipe 5 to the joint body 1 in this way, the insertion portion 50 of the pipe 5 is held by and between the joint body 1 and the pressing insertion portion 21 of the axially immovable inner ring 2. Further, the insertion portion 50 is locally held by and between the outer-end sealing portion 23 of the inner ring 2 and the pushing edge portion 44 of the pushing ring 4. Accordingly, the pipe 5 is held with a strong force to prevent separation, thereby to prevent the pipe 5 from movingly coming out from the joint body 1.

When the threaded connection of the pushing ring 4 is forwarded to strongly fasten the joint body 1, the first primary sealing portion 11 of the joint body 1 is pressingly contacted with the inner-end sealing portion 22 of the inner ring 2 to generate a strong adhering force therebetween. In the resin pipe joint shown in FIG. 1, the secondary sealing portion 12 of the joint body 1 is also pressingly contacted with the outer peripheral sealing surface 30a of the pipe 5, and the outer-end sealing portion 23 of the inner ring 2 is also pressingly contacted with the inner surface of the inclined portion 51 of the pipe 5. Thus, a strong sealing force is generated between the secondary sealing portion 12 and the outer peripheral sealing surface 30a, and between the outer-end sealing portion 23 and the inner surface of the inclined portion 51. Accordingly, the pipe 5 is sealed at both outer and inner peripheral surfaces thereof.

More specifically, this resin pipe joint assures a so-called primary sealing, i.e., a sealing inside of the flow path, at two points, i.e., between the joint body 1 and the inner ring 2 and between the inner ring 2 and the pipe 5. Thus, this pipe joint provides excellent sealing properties to securely prevent a leakage of fluid and entry of foreign matter into the pipe 5. Further, this resin pipe joint also assures a so-called secondary sealing, i.e., a sealing outside of the flow path between the joint body 1 and the pipe 5. Accordingly, even though creep or the like in a heat cycle causes trouble in the primary sealing above-mentioned, this secondary sealing prevents a leakage of an fluid and an entry of foreign matter. This enhances the sealing reliability. Further, in this resin pipe joint, an axial pushing force is exerted to all three sealing portions by the cooperation of the joint body 1 and the pushing ring 4. This considerably restrains the sealing properties from being destroyed due to stress relaxation not only at an ambient temperature but also even though the fluid temperature is increased. Accordingly, the excellent sealing properties may be assured.

Further, the inner ring 2 has an inner diameter equal to the inner diameter of the pipe 5 and equal to the inner diameter of the trunk 14 of the joint body 1. The flow path is therefore uniform in section. This does not prevent smooth movement of the fluid. Thus, the pipe joint of the present invention assures such flowability as to smoothly move the fluid without remaining in the pipe at the pipe joint. Accordingly, this pipe joint may be applied for a pipe used for a liquid having a high purity or ultrapure water.

Figure 2A:
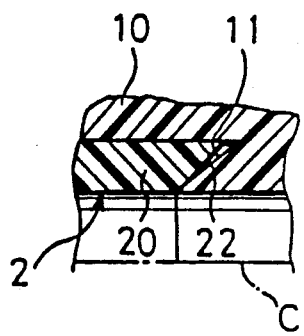
FIG. 2A and 2B are section views of portions of a variant of a primary sealing formed in the pipe joint in FIG. 1.
Figure 2B:
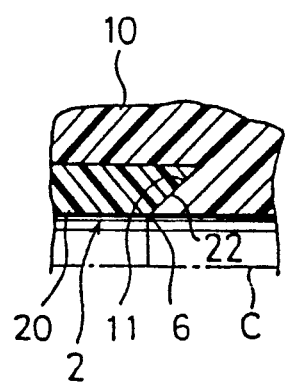

In the resin pipe joint shown in FIG. 1, the inner-end sealing portion 22 of the inner ring 2 is inclined at the same angle at which the first primary sealing portion 11 of the joint body 1 is inclined. However, the inner-end sealing portion 22 may be inclined at an angle different from the angle at which the first primary sealing portion 11 is inclined, as shown in FIG. 2A. In this case, the inner-end sealing portion 22 may be pressingly contacted with the first primary sealing portion 11 with a pushing force generated by the threaded connection of the pushing ring 4, as shown in FIG. 2B. According to such an arrangement, a strong sealing force may be concentrated particularly on inward ends 6 of the first primary sealing portion 11 and the inner-end sealing portion 22, thereby improving the function of restraining the fluid from remaining in the pipe.

Figure 3:
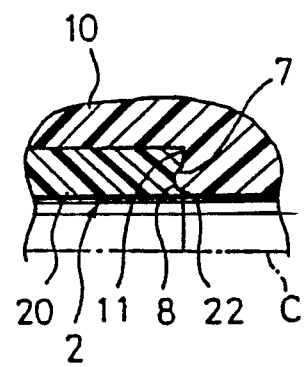
FIG. 3 is a section view of a further variant of the primary sealing.

As shown in FIG. 3, the first primary sealing portion 11 and the inner-end sealing portion 22 may extend in a direction at a right angle to the axis C. A concave portion 7 may be formed in one member (for example, the inner-end sealing portion 22), while a convex portion 8 to be fitted to the concave portion 7 may be formed in the other member (for example, the first primary sealing portion 11).

Figure 4:
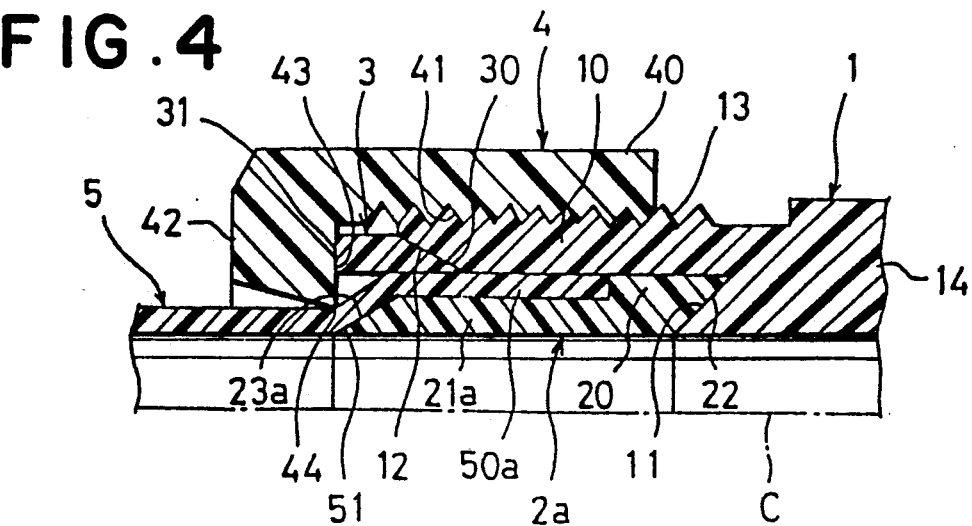
FIG. 4 is a section view of a half portion of a pipe joint made of resin in accordance with another embodiment of the present invention.

FIG. 4 is a section view of a half portion of the pipe joint made of resin in accordance with another embodiment of the present invention. In FIG. 4, like parts are designated by like reference numerals used in FIG. 1. In the following, the description of the like parts is not made.

In FIG. 4, the pipe joint made of resin comprises a joint body 1, an inner ring 2a, an outer ring 3 and a pushing ring 4.

The inner ring 2a has a fitting portion 20 similar to the inner ring 2 mentioned earlier. The inner ring 2a has a pressing insertion portion 21a different from the pressing insertion portion 21 mentioned earlier which has the tapering surface 25. More specifically, the pressing insertion portion 21a is provided on the outer periphery at the outer end thereof with an outer-end sealing portion 23a. The inner diameter of the outer-end sealing portion 23a is gradually increased in a direction from the axial outer end to the axial inner end thereof. The outer end of the outer-end sealing portion 23a intersects the inner peripheral surface of the inner ring 2a. However, the maximum outer diameter of the outer-end sealing portion 23a is the same as the outer diameter of a connecting portion for connecting the pressing insertion portion 21a to the fitting portion 20. Accordingly, the pressing insertion portion 21a is not provided on the outer periphery thereof with a projecting portion. In this connection, an insertion portion 50a of a pipe 5 at one end thereof into which the pressing insertion portion 21a of the inner ring 2a is being pressingly inserted and which is pressingly inserted into a pipe receiving portion 10 of the joint body 1, is merely increased in diameter uniformly in its entirety. When this insertion portion 50a is inserted into the pipe receiving portion 10, an inner-end sealing portion 22 of the inner ring 2a comes in contact with a first primary sealing portion 11 of the joint body 1 and the outer-end sealing portion 23a comes in contact with an inclined portion 51 of the pipe 5, but the pipe 5 does not come in contact with a secondary sealing portion 12 of the joint body 1.

The outer ring 3 has an inner diameter which permits the outer ring 3 to be put on the insertion portion 50a of the pipe 5, and an outer diameter slightly smaller than the inner diameter of an internal thread portion 40 of the pushing ring 4 threadedly connected to an external thread portion 13 of the joint body 1. The outer ring 3 is provided at the inner end thereof with a tapering inner-end sealing surface 30 which comes in contact with the secondary sealing portion 12. The outer ring 3 has an outer end 31 extending in a direction at a right angle to the axis C of the joint body 1. This outer end 31 is adapted to come in contact with an inner end surface 43 of a pushing piece 42 of the pushing ring 4.

In the resin pipe joint shown in FIG. 4, the inner end surface 43 of the pushing piece 42 of the pushing ring 4, serves as a pushing surface for pushing the outer ring 3. Accordingly, the pushing ring 4 pushes the inner ring 2a toward the joint body 1 through the pipe 5 (more specifically, the joint body 1 and the inner ring 2a are pushed toward each other), and also pushes the outer ring 3 toward the joint body 1 (more specifically, the joint body 1 and the outer ring 3 are pushed toward each other). Thus, the pushing ring 4 works so as to hold the joint body 1, the inner ring 2a, the outer ring 3 and the pipe 5 coupled in a unitary structure with a sealing force applied thereto.

According to the resin pipe joint shown in FIG. 4, the insertion portion 50a of the pipe 5 into which the pressing insertion portion 21a of the inner ring 2a is being pressingly inserted, is inserted into the pipe receiving portion 10 of the joint body 1. This causes the inner-end sealing portion 22 to come in contact with the first primary sealing portion 11. Then, the inner-end sealing surface 30 of the outer ring 3 previously put on the pipe 5, comes in contact with the secondary sealing portion 12 of the joint body 1. Then, the internal thread portion 40 of the pushing ring 4 is threadedly connected to the external thread portion 13 of the joint body 1. By forwarding or advancing such threaded connection, the joint body 1 is strongly fastened to connect the pipe 5 to the joint body 1.

According to the arrangement above-mentioned, the insertion portion 50a of the pipe 5 is held by and between the pressing insertion portion 21a of the inner ring 2a and the inner peripheral surface of the outer ring 3, and the insertion portion 50a is also locally held by and between the outer-end sealing portion 23a of the inner ring 2a and the pushing edge 44 of the pushing ring 4. Thus, there is,formed a force for preventing the pipe 5 from seaparating from the joint.

As to the sealings provided by forwarding the threaded connection of the pushing ring 4, there are formed, in the same manner as in the resin pipe joint shown in FIG. 1, the primary sealings between the first primary sealing portion 11 of the joint body 1 and the inner-end sealing portion 22a of the inner ring 2a, and between the outer-end sealing portion 23a of the inner ring 2a and the inclined portion 51a of the pipe 5.

According to the resin pipe joint in FIG. 4, the secondary sealing is formed when the secondary sealing portion 12 of the joint body 1 is pressingly contacted with the inner-end sealing surface 30 of the outer ring 3. As apparent from the foregoing, the outer ring 3 is pushed directly by the inner end surface 43 of the pushing ring 4. This causes the ratio of the secondary sealing force to the primary sealing force to be higher than that in the resin pipe joint shown in FIG. 1.

In the resin pipe joint in FIG. 4 too, the flow path is uniform in section, assuring a smooth movement of the fluid without remaining in the pipe.

Figure 5:
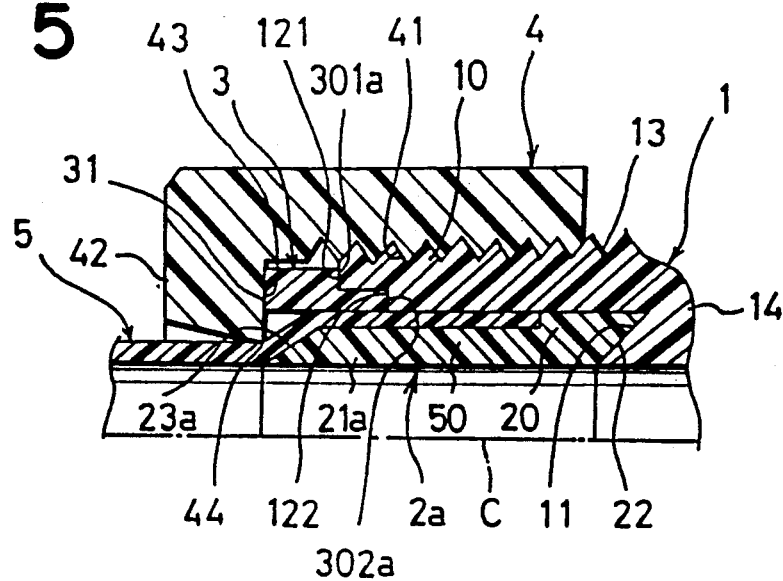
FIG. 5 is a section view of a modification of the pipe joint in FIG. 4.
Figure 6:
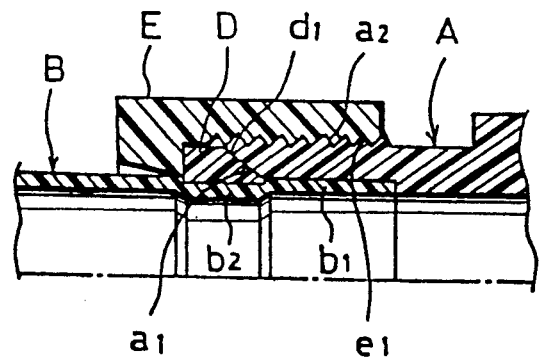
FIG. 6 and FIG. 7 are, respectively, section views of half portions of conventional pipe joints made of resin.
Figure 7:
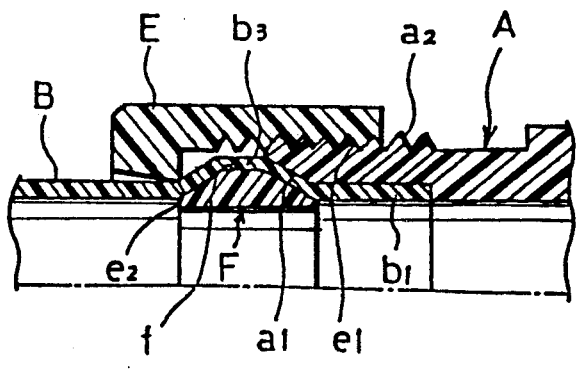

As shown in FIG. 5, the secondary sealing portion 12 of the joint body 1 and the inner-end sealing surface of the outer ring 3 may be formed in tiers by two pressing contact surfaces 301a and 302a which extend in a direction at right angle to the axis C and are axially displaced from each other.

What is claimed is:

1. A pipe joint made of resin, for a pipe having an insertion portion at one end thereof defining an inner diameter, comprising:
    a cylindrical joint body which, with the pipe, defines a pipe joint axis, the cylindrical joint body including a pipe receiving portion having an external threaded surface and an inner part defining an inner diameter and a primary sealing portion extending in a direction which intersects the pipe joint axis;
    an inner ring having an inner diameter substantially equal to that of the pipe and the cylindrical joint body and an outer surface which increases the inner diameter of the pipe insertion portion when the pipe insertion is received between the pipe receiving portion and the inner ring, the inner ring defining an inner-end sealing portion and an outer-end sealing portion both extendign in a direction which intersects the pipe joint axis; and
    a push ring having threads, which threadedly engage with the threads of the pipe receiving portion and pipe pushing means, said pushing ring being displaced relative to said pipe receiving portion as said pushing ring is displaced due to its threaded engagement with the pipe receiving portion such that said pipe pushing means urges the pipe insertion portion toward the primary selaing portion and the primary sealing portion contacts the inner-end sealing portion and the outer-end sealing portion engages the inner diameter of the pipe insertion portion to form primary seals.

2. The pipe joint as defined in claim 1, wherein the primary sealing portion and the inner-end sealing portion are formed by tapering surfaces inclined at the same angle.

3. The pipe joint as defined in claim 1, wherein both the inner-end sealing portion and the primary sealing portion define angles of inclination, and wherein the angle of inclination of the inner-end sealing portion is greater than the angle of inclination of the primary sealing portion.

4. The pipe joint as defined in claim 1, wherein the primary sealing portion and the inner-end sealing portion include concave-convex fitting portions.

5. The pipe joint as defined in claim 1, wherein:
    the inner ring further defines an outer end and a projecting portion at said outer end;
    the pipe receiving portion further has an inlet defining a secondary sealing portion extending in a direction which intersects the pipe joint axis;
    the insertion portion of the pipe includes an outer peripheral sealing surface, said outer peripheral sealing surface being diametrically inwardly inclined in a direction toward the end of the pipe; and
    a secondary sealing is formed at the inlet of the pipe receiving portion by the contact of said outer peripheral sealing surface of the insertion portion of the pipe and said secondary sealing portion when the pushing ring is displaced relative to the pipe receiving portion.

6. The pipe joint as defined in cliam 5, wherein the primary sealing portion and the inner-end sealing portion are formed by tapering surfaces inclined at the same angle.

7. The pipe joint as defined in claim 5, wherein both the inner-end sealing portion and the primary sealing portiond efine angles of inclination, and wherein the angle of inclination of the inner-end sealing portion is greater than the angle of inclination of the primary sealing portion.

8. The pipe joint as defined in claim 5, wherein the primary sealing portion and the inner-end sealing portion include concave-convex fitting portions.

9. The pipe joint as defined in claim 1, further comprising:
    an outer ring having an inner-end sealing portion, wherein:
    the pipe receiving portion further has an inlet defining a secondary sealing portion extending in a direction which intersects the pipe joint axis; and a secondary sealing is formed at the inlet of the pipe receiving portion by the contact of said inner-end sealing portion of said outer ring and said secondary sealing portion when the pushing ring is displaced relative to the pipe receiving portion.

10. The pipe joint as defined in claim 9, wherein the primary sealing portion and the inner-end sealing portion of said inner ring are formed by tapering surfaces inclined at the same angle.

11. The pipe joint as defined in claim 10, wherein the secondary sealing is tapered.

12. The pipe joint as defined in claim 10, wherein the secondary sealing is tiered.

13. The pipe joint as defined in claim 9, wherein both the inner-end sealing portion of said inner ring and the primary sealing portion define angles of inclination, and wherein the angle of inclination of the inner-end sealing portion is greater than the angle of inclination of the primary sealing portion.

14. The pipe joint as defined in claim 13, wherein the secondary sealing is tapered.

15. The pipe joint as defined in claim 13, wherein the secondary sealing is tiered.

16. The pipe joint as defined in claim 9, wherein the primary sealing portion and the inner-end sealing portion of said inner ring include concave-convex fitting portions.

17. The pipe joint as defined in claim 16, wherein the secondary sealing is tapered.

18. The pipe joint as defined in claim 16, wherein the secondary sealing is tiered.

19. The pipe joint as defined in claim 9, wherein the secondary sealing is tapered.

20. The pipe joint as defined in claim 9, wherein the secondary sealing is tiered.

21. A pipe joint made of resing, for a pipe having an insertion portion at one end thereof defining an inner diameter and a sealing portion, comprising:

a cylindrical joint body which, with the pipe, defines a pipe joint axis, the cylindical joint body including a pipe receiving portion having an external threaded surface and an inner part defining an inner diameter and a primary sealing portion extending in a direction which intersects the pipe joint axis;

an inner ring having an inner diameter substantially equal to that of the pipe and the cylindrical joint body and an outer surface which increases the inner diameter of the pipe insertion portion when the pipe insertion portion is received between the pipe receiving portion and the inner ring, the inner ring defining an inner-end sealing portion, a spaced apart further sealing portion and an outer-end sealing portion, each extending in directions which intersect the pipe joint axis; and a pushing ring having threds which threadedly engage with the threads of the pipe receiving portion and pipe pushing means, said pushing ring being displaced relative to said pipe receiving portion as said pushing ring is displaced due to its threaded engagement with the pipe receivign portion such that said pipe pushing means urges the pipe insertion portion toward the primary sealing portion and the primary sealing portion contacts the inner-end sealing portion and the outer-end sealing portion engages the inner diameter of the pipe insertion portion to form primary seals, and the further sealing portion of said inner ring contacts the sealing portion of the pipe insertion portion.

* * * * *

UNITED STATES PATENT AND TRADEMARK OFFICE
CERTIFICATE OF CORRECTION

PATENT NO. : 5,154,453
DATED : October 13, 1992
INVENTOR(S) : Kiyoshi Nishio It is certified that error appears in the above-identified patent and that said Letters Patent is hereby corrected as shown below:

Claim 1, column 10, line 6, "extendign" should be "extending";

line 8, "push" should be "pushing"; and line 15, "selaing" should be "sealing".

Claim 7, column 10, line 55, "efine" should be "define".

Claim 21, column 12, line 3, "resing" should be "resin"; and line 22, "threds" should be "threads".
Claim 7, col. 10, line 55, "portiond" should be --portion--

Signed and Sealed this

Sixteenth Day of November, 1993

Attest:

BRUCE LEHMAN

Attesting Officer

Commissioner of Patents and Trademarks